United States Patent [19]

Walther

[11] Patent Number: 4,896,067
[45] Date of Patent: Jan. 23, 1990

[54] ELECTRICAL MACHINE, ESPECIALLY ELECTRIC MOTOR

[75] Inventor: Bernd Walther, Bietigheim-Bissingen, Fed. Rep. of Germany

[73] Assignee: SWF Auto-Electric GmbH, Bietigheim-Bissingen, Fed. Rep. of Germany

[21] Appl. No.: 192,743
[22] PCT Filed: Aug. 7, 1987
[86] PCT No.: PCT/EP87/00431
 § 371 Date: Apr. 29, 1988
 § 102(e) Date: Apr. 29, 1988
[87] PCT Pub. No.: WO88/01802
 PCT Pub. Date: Mar. 10, 1988

[30] Foreign Application Priority Data

Aug. 30, 1986 [DE] Fed. Rep. of Germany ....... 3629634

[51] Int. Cl.$^4$ ............................................. H02K 13/00
[52] U.S. Cl. .................. 310/239; 310/68 R; 310/72; 310/91
[58] Field of Search ............ 310/239, 68 R, 68 C, 310/43, 72, 89, 91, 242, 245, 247, 249, 219, 238

[56] References Cited

U.S. PATENT DOCUMENTS

| 4,329,605 | 5/1982 | Angi | 310/68 R |
| 4,340,831 | 7/1982 | Kuhlmann | 310/68 R |
| 4,342,934 | 8/1982 | Van Wijhe | 310/68 R |
| 4,426,770 | 1/1984 | Frank | 310/68 R |
| 4,449,090 | 5/1984 | Gotoh | 310/68 R |
| 4,638,204 | 1/1987 | Kirchner | 310/239 |
| 4,673,837 | 6/1987 | Gingerich | 310/72 |

FOREIGN PATENT DOCUMENTS

| 2853905 | 6/1960 | Fed. Rep. of Germany . |
| 2813956 | 4/1979 | Fed. Rep. of Germany . |
| 2019175 | 6/1970 | France . |
| 2463990 | 2/1981 | France . |
| 1289359 | 9/1972 | United Kingdom . |
| 2346875 | 10/1977 | United Kingdom . |
| 2018045 | 10/1979 | United Kingdom . |
| 2044552 | 10/1980 | United Kingdom . |
| 2140218 | 11/1984 | United Kingdom . |

Primary Examiner—R. Skudy
Attorney, Agent, or Firm—Robert P. Seitter

[57] ABSTRACT

A brush mounting plate for an electric motor is formed as a one piece element molded from a suitable electrically non conductive material. The plate is formed with various openings, recesses and lugs on its opposed faces which serve to mount and locate components such as brush holders, inductors, and thermo switches in a compact arrangement with various components assembled to opposite faces of the plate in a stacked relationship axially of the plate. The lugs are so arranged as to enable a snap fit assembly of the inductor and thermo switches on to the plate.

3 Claims, 3 Drawing Sheets

ELECTRICAL MACHINE, ESPECIALLY ELECTRIC MOTOR

BACKGROUND OF THE INVENTION

The present invention is directed to a brush mounting assembly for an electric motor.

It is known in the prior art to mount the brushes of an electric motor upon a plate or frame which is also employed to mount other electric components, such as the inductors, etc. of a noise suppression circuit and thermal switches for interrupting the motor circuit in the event of over heating. These mounting plates are customarily formed with a centrally located opening through which the motor armature projects, with the brush holders located at dynamically opposite sides of the central opening. Space is at a premium, and the locating and mounting of the brushes and associated circuit elements upon the relatively small mounting plate in a compact manner such that the individual elements may be easily assembled and accessibly presents problems which have not been fully solved in the prior art.

SUMMARY OF THE INVENTION

In accordance with the present invention, a disk-like brush mounting plate is formed of a suitable non-electrically conductive plastic material as an integral one-piece molded structure. The mounting plate is provided with openings through which tabs of metal brush holders may be projected and bent into place, and with recesses and projecting lugs associated with the various recesses arranged in a manner such that circuit components, such as inductors or thermal switches may readily be assembled on to the plate by a snap fit. The plate is so designed that certain components, when assembled to the structure, are located on one side of the disk like plate, while other components are located on the opposite side of the plate—i.e. the components are axially spaced from each other in relationship to the axis of the central armature receiving opening to achieve a very compact assembly.

Other objects and features of the invention will become apparent by reference to the following specification and to the drawings.

IN THE DRAWINGS

Figure 1:
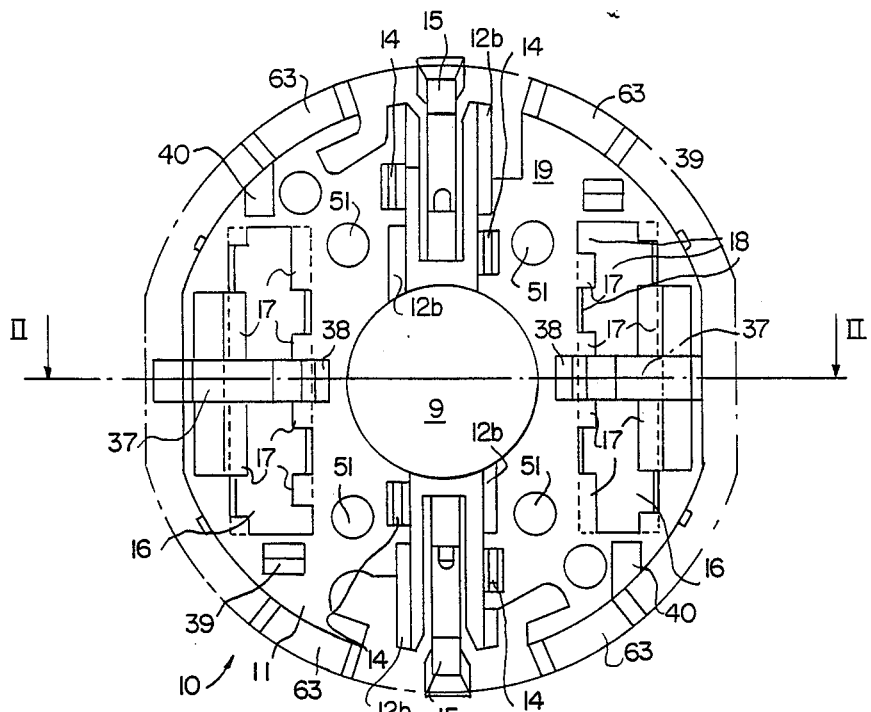
FIG. 1 is an end view of the rear face of a brush mounting structure embodying the present invention.
Figure 2:
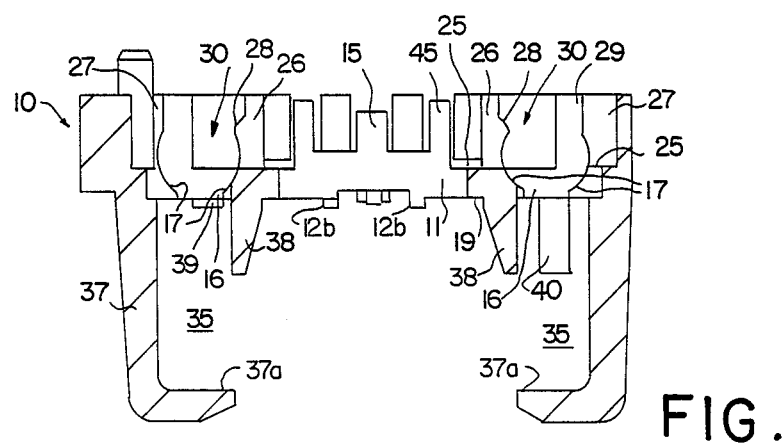
FIG. 2 is a cross-sectional view of the structure of FIG. 1 taken on the line II—II of FIG. 1.
Figure 3:
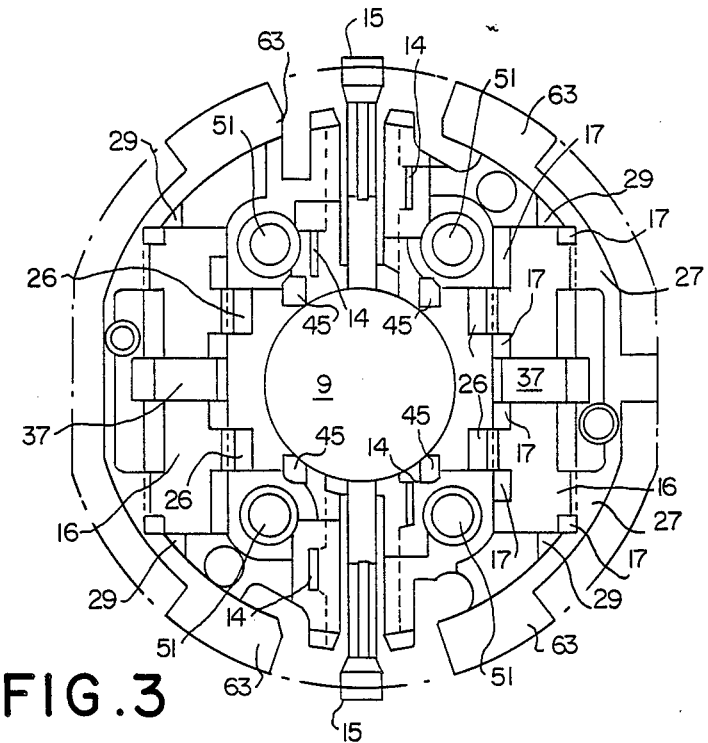
FIG. 3 is an end view of the front face of the mounting structure of FIG. 1.

A brush assembly embodying the present invention includes a one-piece mounting plate designated generally 10 of a suitable non conductive plastic material preferably formed by a molding operation. Mounting plate 10 includes a planar disk-like main portion 11 formed on its front 25 and rear 19 faces with various apertures and projecting lugs to be described below. In FIGS. 1-3, mounting plate 10 is shown alone, while in FIGS. 4 and 5, which correspond to FIGS. 1 and 2, mounting plate 10 is shown with various electrical and mechanical components assembled to it.

Figure 4:
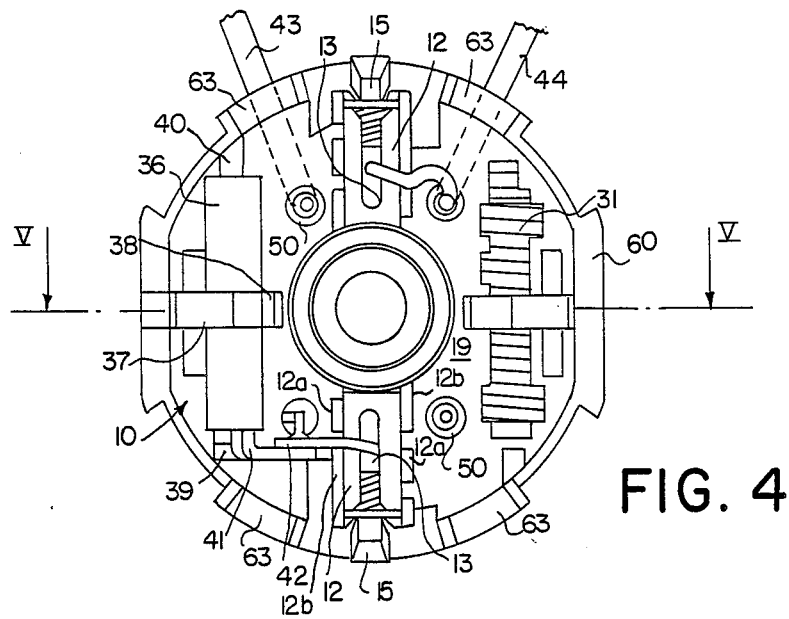
FIG. 4 is an rear view of the mounting structure of FIG. 1 showing various circuit components assembled to the mounting structure.
Figure 5:
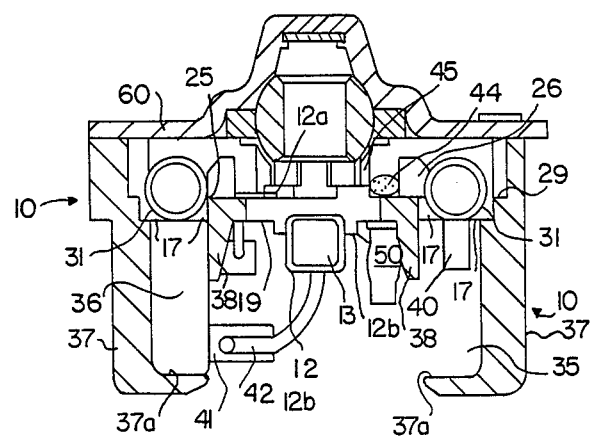
FIG. 5 is a cross-sectional view taken on the line V—V of FIG. 4.

Mounting plate 10 is formed with a centrally located opening 9 through which, when the plate is assembled with an electric motor in a well-known manner, the motor armature will project. A pair of hollow, tubular brush holders 12 (FIGS. 4 and 5) which slidably receive motor brushes 13 may be mounted upon the rear side of the disk-like main portion 11 by means of mounting tabs 12a formed on brush holder 12 which project through slot-like openings 14 (FIGS. 1 and 3) through main portion 12 to be bent into engagement with the front face 25 to retain brush holder 12 in position. Preferably, the rear face 19 of main portion 11 is formed with projecting ribs 12b which extend along and engage opposed sides of the tubular brush holders 12 as best seen in FIGS. 4 and 5 to locate the elongate brush holders 12 in radial alignment with the axis of opening 9. Radial outward movement of brush holders 12 is limited by lugs 15 (FIG. 4) which engage the outer ends of holders 12.

A pair of elongate recesses 16 which open through main portion 11 are located at diametrically opposed sides of opening 9 to extend longitudinally in parallel relationship to the longitudinal orientation of brush holders 12 established by ribs 12b. Referring now particularly to FIGS. 1 and 2, tab like projections 17 formed on mounting plate 12 project into recess 16 from opposite sides and are formed with concave forwardly (upwardly as viewed in FIG. 2) facing surfaces. Lugs 26, 27 (FIGS. 2 and 4) projecting from the front face 25 of mounting plate are disposed upon opposite sides of the respective recesses 16 and, as best seen in FIG. 2, are formed with concave recesses which, when viewed longitudinally of recesses 16 as in FIG. 2, form a smooth continuation of the concave surfaces of projections 17. Ratchet lug sections as at 28 are disposed on members 26 (FIG. 2) so that the concave surfaces on projections 17 and lugs 26, 27 form a generally cylindrical recess as viewed in FIG. 2 into which a cylindrical inductor coil 31 (FIGS. 4 and 5) can be snap fitted by pressing the coil downwardly into the recess in the front face until the coil snaps beneath the ratchet sections 28. Projections 29 (FIG. 3) on the front face 25 limit axial movement of the coil 31, once it is in position.

A series of lugs 37, 38, 39 and 40 projecting from the rearward face 19 of main portion 11 of the mounting plate cooperatively define recesses 35 which are conformed to receive a rectangular box-like (cuboid) thermo switch 36 (FIGS. 4 and 5). As best seen in FIG. 2, lugs 37 project rearwardly from rear face 19 and are formed at their rearward ends with an inwardly projecting toe portion 37a. Lugs 38 project rearwardly from face 19 in facing opposed space relationship to lugs 37. Lugs 39 and 40 also project rearwardly from surface 19. Lug 39 is a relatively short lug which acts as a locking detent.

Referring now to FIG. 5 the thermo switch 36 is inserted into its assembled position by inclining it upwardly (as viewed in FIG. 5), upwardly through the opening between the lower end of lug 38 and the projecting tow 37a. The lug 38 and toe portion 37a possess sufficient resilience so that switch 30 can be forced into the position shown in FIGS. 4 and 5 where the opposed sides of the switch 36 as viewed in FIG. 3 are engaged between the facing surfaces of lug 38 and lug 37. As viewed in FIG. 5, the top surface of switch 36 is engaged beneath the projections 17 which define the bottom of recess 16 and support the inductor 31, while the lower surface of switch 36 as viewed in FIG. 5 is seated upon toe portion 37a of lug 37. Referring now to FIG. 4, it is seen that the remaining opposed end surfaces of switch 36 are engaged at one end by a lug 40 and at the opposite end by the detent like lug 39. Lug 40 likewise possesses sufficient resilience so that switch 36 may be tilted as may be convenient in inserting or replacing the switch, the relatively short detent like projection 39 providing a detent like lock holding the switch in its final assembled position.

It is believed apparent from the foregoing that the inductors 31 are snapped fitted into assembled positions upon the mounting plate from the front side of the plate and that these assembled positions are established by the various recesses, projections and lugs described above. Similarly, the thermo switch is assembled to mounting plate 10 from its rear side, and again is snap fitted into a position established by the various lugs integrally formed on the mounting plate as described above.

As best seen in FIG. 5, this arrangement enables a thermo switch 36 and inductor 31 to be stacked axially of the assembly relative to one another so that an extremely compact assembly is achieved. Although FIG. 5 shows only one thermo switch 36, it is believed apparent that if desired, a second thermo switch 36 could be assembled into the unoccupied space 35 at the opposite side of the mounting plate.

The various electrical components and the brushes 13 are electrically connected with each other and, via supply cables 43 and 44, to an external voltage source (not shown). To guide the various electrical leads or cables across the front face of mounting plate 10, forwardly projecting posts 45 (FIGS. 3, 5) are formed on mounting plate 10, one post 45 being located in adjacent spaced relationship to each lug 26 to form a guide channel, as for the cable 44 as seen in FIG. 5. At the rearward face 19, where more space is available, leads such as 42 which connect a terminal 41 on the thermol switch to a carbon brush are kept relatively short and need no guidance.

Figure 7:
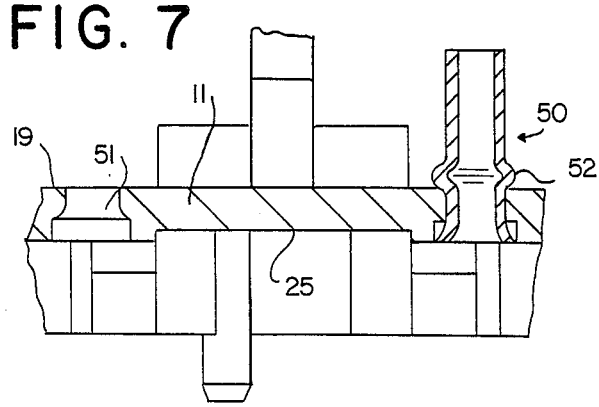
FIG. 7 is a detailed cross-sectional view showing the manner in which a tubular rivet is mounted upon the mounting structure of the preceding figures.

Mounting plate 10 is further formed with bores 51 (FIGS. 3 and 7) which provide a means for mounting tubular rivets 50 (FIG. 7). As best seen in FIG. 7, the bores 51 are formed within an enlarged diameter counter bore extending inwardly from front face 25. The tubular rivets 50 are supplied with an outwardly projecting annular bead 52 which, as seen in FIG. 7, will seat against rear face 19 and the rivet is fixed to plate 11 by radially extending the rivet walls into the large diameter counter bore potion of bore 51. This arrangement results in the projecting portion of the rivet 50 being located to project from the rear face 19 of the mounting plate where more space is available. The supply leads are inserted into rivet 50 from front fact 25 and, after the supply lead is properly positioned, the walls of rivet 50 are crimped to mechanically clamp the supply lead in place.

Figure 6:
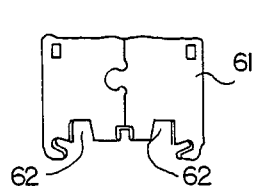
FIG. 6 is a partial view of a housing cover employed with the mounting structure.

When assembled into an electric motor (not shown) an end cap 60 (FIG. 5) is fixedly attached to mounting plate 10 to overlie the front face 25 of the plate as shown in FIG. 5. Mounting plate 10 in turn is inserted axially into the end of a hollow cylindrical cover 61 (FIG. 6), the scale of the cover as shown in FIG. 1 being smaller than that of the other figures. Cover 61 is formed at its end with recesses 62 which are conformed to receive lugs 63 (FIG. 4) which project rearwardly from rear face 19 and are of a configuration complementary to recesses 42 to align cover 61 with mounting plate 10.

What is claimed is:

1. A brush mounting device for mounting the elongate brush holders, at least one first generally cylindrical circuit component and at least one generally cuboid second circuit component of an electric motor, said device comprising a one piece member of an electrically non conductive material including a generally flat disc like plate portion having a front face, a rear face and a central opening extending through said plate portion along an axis perpendicular to said front and rear faces, first means on said plate portion for fixedly mounting a pair of elongate brush holders upon said rear face at diametrically opposite sides of said central opening with the longitudinal axes of said holders in alignment with each other, second means integral with said plate portion for mounting a pair of first generally cylindrical circuit components upon the front face of said plate portion at diametrically opposite sides of said central opening with the longitudinal axes of said first components extending parallel to each other, and third means integral with said plate portion for mounting said at least one generally second circuit cuboid component on said plate portion upon the rear face of said plate portion directly opposite one of said first generally cylindrical circuit components.

2. The invention defined in claim 1 wherein said second means comprises means defining an elongate transversely concave seat in said front face conformed to receive and locate said first generally cylindrical circuit components upon said plate portion, a plurality of first lugs integral with said plate portion projecting forwardly from said front face at opposite sides of said recess, and detent-like projections on the sides of said lugs facing said recess for releasably retaining said first generally cylindrical circuit components on said seat.

3. The invention defined in claim 1 wherein said third means comprises a plurality of second lugs integral with said plate portion and projecting downwardly from said rear face, a first two of said second lugs being located in spaced opposed relationship to each other, one of the two last mentioned lugs having a toe portion at its rearward end projecting generally toward the other of said two last mentioned lugs in spaced parallel relationship to said rear face, said first two lugs being located on two opposed sides of a rectangle conformed to one side of said cuboid second circuit component, a second two of said second lugs being located on the two remaining sides of said rectangle, one of the last mentioned two lugs projecting a relatively short distance from said rear face to constitute a detent operable to releasably retain a second component between said second lugs with a first two opposed sides of the at least one generally second cuboid circuit component engaged between said first two second lugs, a second two opposed sides of said second circuit component engaged between said second two of said second lugs, and the remaining two opposed sides of said second component being engaged between said toe portion and said rear face.

* * * * *